Figure 1:
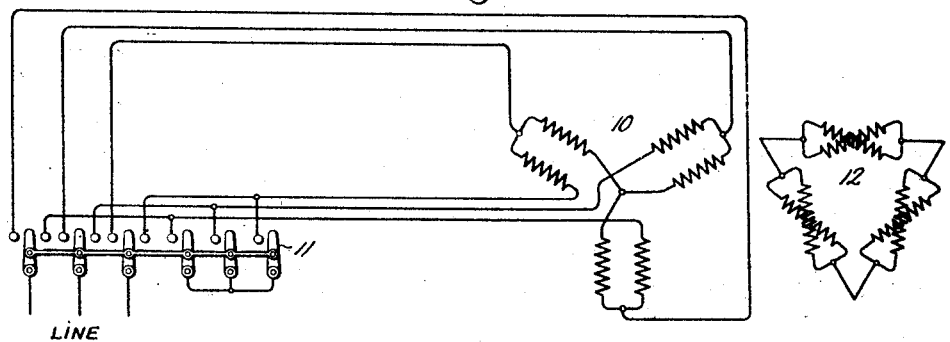

Sept. 1, 1925.

C. MACMILLAN

ASYNCHRONOUS MOTOR

Filed April 12, 1924

1,552,385

Inventor:
Campbell Macmillan,
by *Alexander S. Lunt*
His Attorney.

Patented Sept. 1, 1925.

1,552,385

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ASYNCHRONOUS MOTOR.

Application filed April 12, 1924. Serial No. 706,199.

*To all whom it may concern:*

Be it known that I, CAMPBELL MACMILLAN, a citizen of the United States, residing at Schenectady, in the county of Schenectady, State of New York, have invented certain new and useful Improvements in Asynchronous Motors, of which the following is a specification.

My invention relates to alternating current dynamo electric machines, and in particular to the secondary members of asynchronous motors.

This application is a continuation in part of my co-pending application, Serial No. 566,552, filed June 7, 1922, entitled "Asynchronous motors", and assigned to the same assignee as the present application. In my prior application, above referred to, I have described a form of secondary winding for induction motors which gives the desirable starting torque and running efficiency of the form wound secondary type of induction motor, but without the necessity of providing the external starting resistance commonly used in such motors. The arrangement, which is particularly described and claimed in my prior application, consists of a form wound secondary provided with a short-circuiting device, the secondary being so arranged that, with the short-circuit removed, relatively large currents are caused to flow in local low inductance, high resistance circuits in the secondary winding by reason of a resistance voltage difference existing in such circuits. This condition exists during the starting period and produces a high starting torque. When the motor comes up to speed the short-circuiting device is closed and the secondary then functions, in general, like the usual short-circuited form wound secondary for efficient normal operation.

Another arrangement which was briefly described in my prior application makes use of a phase voltage difference instead of a resistance voltage difference for producing currents in the short-circuits of the secondary winding during the starting period, the phase difference during the starting period being produced by reason of a stator connection for a larger number of poles than is used during the running period, and it is the object of the present application to cover this last mentioned arrangement.

The invention takes the form of a secondary winding having short-circuited groups of coils used with a standard two-speed stator, the secondary winding being arranged so that, with the low speed stator connection, E. M. F.'s having a substantial phase difference are induced in the short-circuit coils of the secondary whereby high secondary currents and ample starting torque is produced. When the stator is reconnected for high speed operation the rotor short-circuits become parallel paths of low resistance substantially electrically similar to the usual form wound secondary when the slip rings of such a secondary are short-circuited.

The features of my invention which I believe to be novel and patentable will be pointed out in the claims appended hereto. For a better understanding of my invention reference is made in the following description to the accompanying drawing which illustrates in Fig. 1 a schematic diagram of the stator and rotor windings of a motor built in accordance with my invention, together with a pole changing switch for the stator; Fig. 2 shows in detail a portion of the secondary windings of such a motor where two bars per slot are used, and Fig. 3 shows a portion of the secondary windings of a modification arranged with 4 bars per slot.

Figure 2:
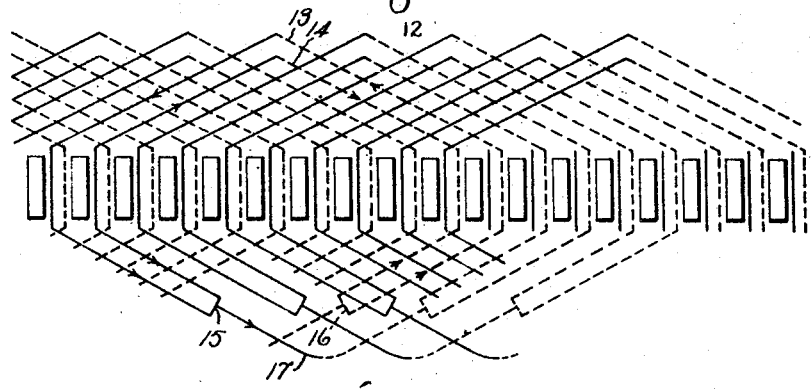

Referring now to Fig. 1, 10 represents the stator windings of an induction motor arranged to be connected for different pole numbers. This arrangement may be any well known form of two-speed connections. For the purpose of describing my invention the stator windings are represented as connected to a double throw, multiple pole line switch 11, such that, when the switch is thrown to the left the stator windings are connected to the line for the pole number used for starting with the two sets of stator coils shown connected in parallel star and when the switch is thrown to the right the two sets of stator coils are connected to the line in series star for a lower pole number connection used for normal operation. 12 represents the rotor windings and, as will be explained more in detail later, when the stator is connected for the larger number of poles, E. M. F.'s having a substantial phase difference are induced in local short-circuited groups of coils in the secondary giving it a high resistance and low inductance, and when the stator is connected for normal operation the local short-circuited secondary coils become parallel circuits of a lower resistance.

Referring now to Fig. 2, this represents a portion of the secondary coils of a secondary member built in accordance with my invention in which two bars per slot forming the edges of different coils are used. The secondary will be considered as having 18 slots and teeth and used with a stator arranged to be connected for 4 poles for starting and two poles for running. The secondary winding is permanently connected, by which I mean that no change in connection whatever is necessary in the secondary when changing over from low to high speed in the stator and, consequently, no slip rings or other external connections to the secondary are needed. A secondary coil 13 enclosing 10 teeth and a secondary coil 14 enclosing 8 teeth are concentrically arranged and have their adjacent coil ends connected together at one end of the rotor as represented at 15 and 16 and this group of coils is connected to adjacent groups of coils by connections 17. The other coils are similarly connected. The direction of current flow in these coils for the two pole connection of the stator is indicated by arrows in the lower end connections and the direction of current flow in these coils for the 4 pole stator connection is indicated by arrows in the upper end connections. Thus, for the 4 pole connections the coils 13 and 14 form a local short-circuit with currents flowing in opposite direction in the parallel end connections. This is true of all the groups formed by the pairs of coils in the secondary because it will be apparent that the rotating 4 pole field of the stator induces E. M. F.'s having nearly 180 degrees out-of-phase components in each such group. When the stator is connected for the two pole connections the induced currents, in each group of coils, are approximately in phase and instead of being confined to local short-circuits flow in series from group to group across the end connections 17. For the 4 pole connections there is no tendency for the currents to flow across the end connections 17.

Figure 3:
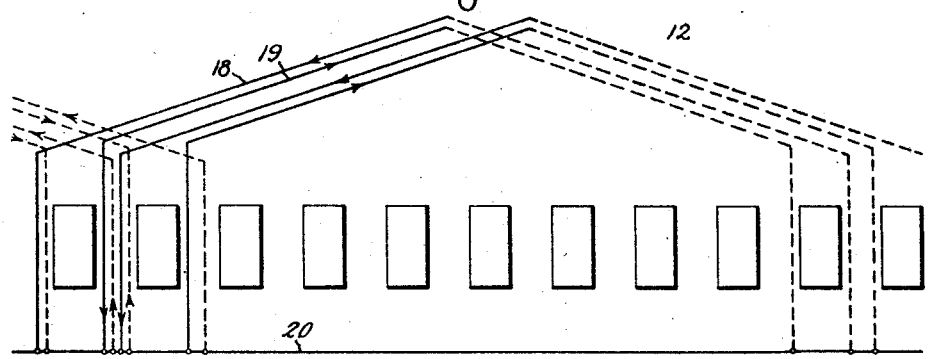

In Fig. 3, I have illustrated my invention applied to a secondary having 4 bars per slot. Here the rotor is illustrated as having 9 slots per pole for the lower number of poles and 4½ slots per pole for the larger number of poles. Coil 18 encloses 10 teeth and coil 19 encloses 8 teeth. All the coils have a common end connection 20 at one end of the rotor. The arrows at the upper end of the secondary indicate the direction of current flow for the low speed or starting connection of the stator and the arrows at the lower end of the secondary indicate the direction of current flow for the high speed or running connection at a given instant. The reasoning for the direction of current flow is the same as that given for Fig. 2.

The arrangement of Fig. 3 has an advantage over the arrangement of Fig. 2 in that the same effective current per slot and the same current density per bar are obtained during the starting period without the addition of any appreciable leakage flux passing between the bars which carry substantially opposite currents. The net effective current is therefore accompanied by a reactance which is not appreciably increased by the fact that it is composed of two large components having a small vector difference. Thus we have in this arrangement conductors side by side in the same slot, but belonging to different circuits in which voltages differing in phase are induced such that the conductors carry currents which are approximately in phase for one pole number connection and carry currents which are nearly 180 degrees out-of-phase for the other pole number connection. The secondary thus has circuits of equivalent high resistance responsive to one pole number of the stator and lower equivalent resistance circuits responsive to the other pole number. By equivalent high resistance, I mean that a correspondingly large amount of energy may be dissipated, in this case due to the normal resistance associated with large currents, with the same effective current and by effective current I mean the secondary current which is equal to the primary current with due allowance for the transformer ratio and the deduction of the necessary magnetizing current. As is usual the conductors shown in dotted lines lie at the bottom of the slots and the conductors shown in full lines lie at the top of the slots. Like the arrangement of Fig. 2 the arrangement of Fig. 3 has adjacent coil ends which carry currents nearly opposite in phase when responsive to the greater stator pole number, thus enclosing the minimum permeance path between such currents which reduces the end coil reactance to a minimum.

I do not wish to be limited to the exact modifications described or to any particular ratio of pole numbers in the two stator connections but seek to cover in the appended claims all modifications coming fairly within the scope of my invention.

What I claim as new and desire to secure by Letters Patent of the United States, is:—

1. An alternating current motor of the asynchronous type comprising a single primary member arranged to be connected for different pole numbers and a single secondary member provided with a permanently connected winding composed of a plurality of pairs of concentrically arranged coils of different pitch having equivalent high resistance circuits responsive only to the field produced by the larger pole number connection of the stator and having lower equivalent resistance circuits responsive only to the field produced by the smaller pole number connection of the stator.

2. An asynchronous motor comprising a primary member arranged to be connected for different pole numbers and a secondary member having a slotted core member and a coil winding carried in said slots composed of pairs of concentrically arranged coils of different pitch, said winding having a plurality of different circuits in which voltages differing nearly 180 degrees in phase are induced when the primary is connected for one pole number, and in which voltages approximately in phase are induced when the primary is connected for the other pole number, the winding conductors belonging to different circuits being placed side by side in the same slots.

3. An asynchronous motor according to claim 2, characterized by the fact that coil ends of the secondary winding which carry currents of nearly opposite phase when the primary is connected for one pole number are arranged in pairs adjacent to and parallel to each other, thereby reducing the end coil reactance to a minimum.

4. A secondary member for asynchronous machines comprising a slotted core member and a winding carried thereby, said winding comprising a plurality of pairs of concentrically arranged coils of different pitch having the end connections of each pair arranged adjacent to each other at one end of the secondary and the end connections of all the pairs permanently connected at the other end of the secondary.

5. A secondary member for asynchronous machines comprising a slotted core member and a winding carried thereby, said winding comprising a plurality of pairs of concentrically arranged coils of different pitch having common end connections at one end of the secondary, each slot of the rotor containing one coil side from four different pairs of coils.

In witness whereof, I have hereunto set my hand this 11th day of April, 1924.

CAMPBELL MACMILLAN.